United States Patent
White et al.

[11] Patent Number: 6,119,208
[45] Date of Patent: Sep. 12, 2000

[54] MVS DEVICE BACKUP SYSTEM FOR A DATA PROCESSOR USING A DATA STORAGE SUBSYSTEM SNAPSHOT COPY CAPABILITY

[75] Inventors: Michael Wayne White, Lafayette; Patrick James Tomsula, Arvada, both of Colo.

[73] Assignee: Storage Technology Corporation, Louisville, Colo.

[21] Appl. No.: 08/844,480

[22] Filed: Apr. 18, 1997

[51] Int. Cl.[7] .............................. G06F 13/00; G06F 12/00
[52] U.S. Cl. ........................... 711/162; 711/111; 711/112; 711/161
[58] Field of Search .................................. 711/161, 162, 711/111, 112

[56] References Cited

U.S. PATENT DOCUMENTS

| | | | |
|---|---|---|---|
| 5,212,784 | 5/1993 | Sparks ...................................... | 395/575 |
| 5,255,270 | 10/1993 | Yanai et al. ............................. | 371/10.2 |
| 5,276,860 | 1/1994 | Fortier et al. ............................ | 395/575 |
| 5,630,092 | 5/1997 | Carreiro et al. ......................... | 395/438 |
| 5,649,152 | 7/1997 | Ohran et al. ............................. | 395/441 |

FOREIGN PATENT DOCUMENTS

| | | | |
|---|---|---|---|
| 0 566 967 A2 | 10/1993 | European Pat. Off. ........ | G06F 11/14 |
| 0 767 431 A1 | 4/1997 | European Pat. Off. ........ | G06F 11/14 |

*Primary Examiner*—John W. Cabeca
*Assistant Examiner*—Tuan V. Thai
*Attorney, Agent, or Firm*—Duft, Graziano & Forest, P.C.

[57] ABSTRACT

The MVS device backup system functions to enable the data processor to manage the device backup function of a disk data storage subsystem in a manner that minimizes the expenditure of data processor resources. This is accomplished by the MVS device backup system determining the source device volume on the data storage subsystem, the target device volume on the data storage subsystem and identifying the extent of both. The MVS device backup system then transmits data to the data storage subsystem, representative of the assignment of DASD full tracks from the source device location on the data storage subsystem as well as DASD full tracks from the target (backup) device location on the data storage subsystem. The data processor based MVS device backup system then uses ECAM channel programs to instruct the data storage subsystem to perform the device backup operation using snapshot track pointer copy operations. Upon conclusion of the device backup operation by the data storage subsystem, the MVS device backup system updates the meta data required to complete the device backup operation.

16 Claims, 2 Drawing Sheets

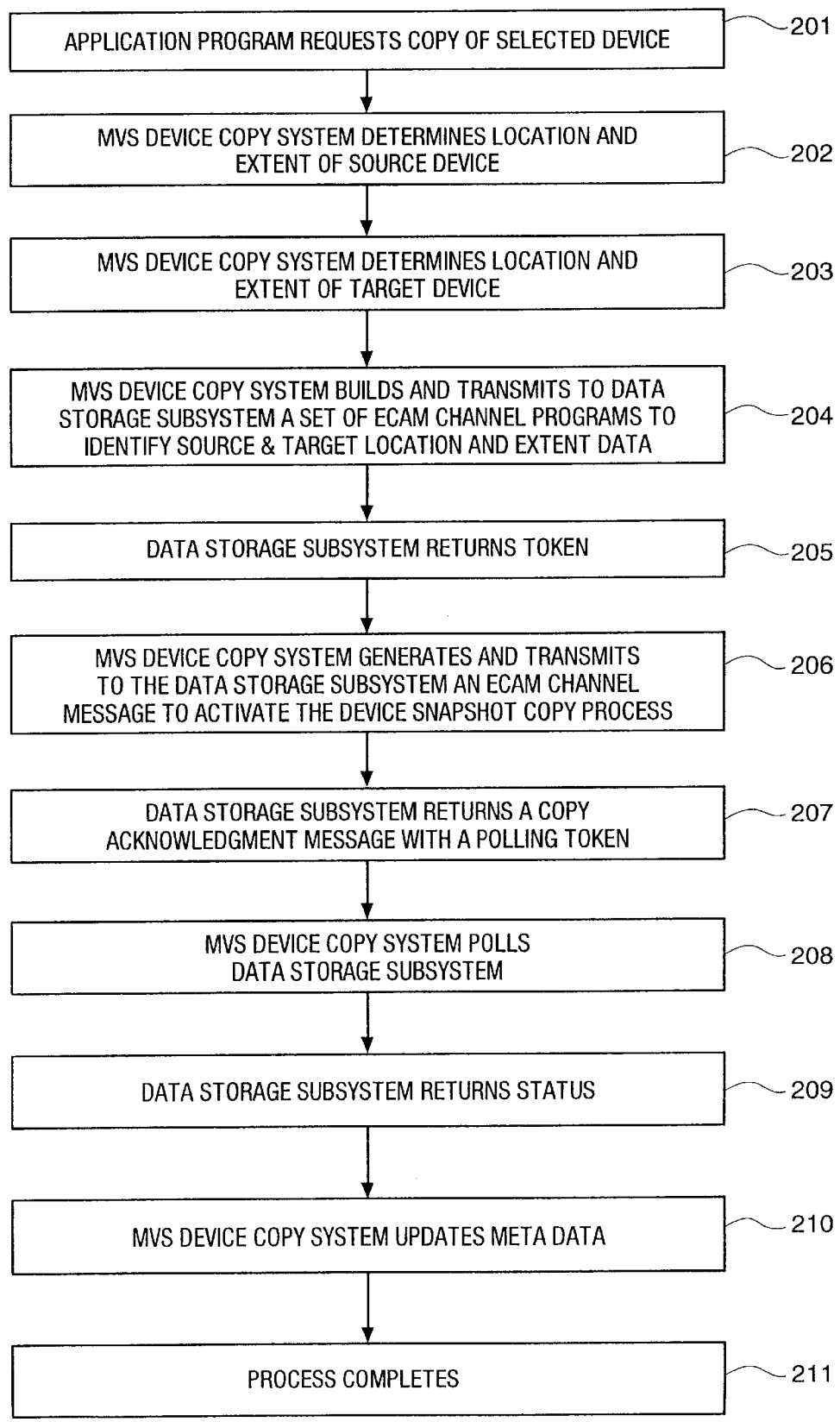

MVS DEVICE BACKUP SYSTEM FOR A DATA PROCESSOR USING A DATA STORAGE SUBSYSTEM SNAPSHOT COPY CAPABILITY

CROSS REFERENCE TO RELATED APPLICATIONS

This application is related to copending applications titled "System For Providing Write Notification During Data Set Copy" and "DASD File Copy System For A Data Processor Using A Data Storage Subsystem Snapshot Copy Capability", filed on the same date as the present invention, Ser. No. 08/843,544 (now U.S. Pat. No. 5,915,264) and Ser. No. 08/844,046 (now pending), respectively.

FIELD OF THE INVENTION

This invention relates to data storage subsystems, and, in particular, to an MVS device backup system which is resident on a data processor and which regulates the backup of an MVS device on to the virtual data storage devices of a data storage subsystem which is connected to the data processor. The MVS device backup system manages the designation of the source and target data storage volumes and activates the snapshot copy resources of the data storage subsystem to perform the device backup operation without the necessity of the data processor having to expend a significant amount of processing resources.

PROBLEM

It is a problem in the field of computer systems to efficiently create backup copies of the data sets of an MVS device, which backup copies represent a single point-in-time for all data resident on the source MVS device. In a typical computer system, data processors are connected to one or more data storage subsystems, which include disk drive memory systems. The data processors and their associated data storage subsystems therefore must manage the backup of data sets stored on the virtual volumes of the data storage subsystem in a manner that does not adversely impact the performance and efficiency of the data processor and which also ensures the integrity of the data.

The backup of device data in a traditional DASD data storage subsystem entails the data processor retrieving the device data from the data storage subsystem, then writing the retrieved device data to a designated backup data storage location in the data storage subsystem. In particular, as part of this process, device data backup utilities perform volume track level backup by executing a series of read and write channel programs. These channel programs read data from the data storage subsystem into memory on a data processor and then write the data back out to the backup data storage subsystem as a series channel programs from that data processor memory. This system is resource intensive, in that the data processor expends a significant amount of resources (CPU cycles) to achieve the device data backup operation. In addition, channel resources are needed to perform the data processor based device backup operation. Furthermore, two significant difficulties with data storage subsystems are the time required to make backup copies of device data and the need to maintain the consistency of the device data during the time it takes to make backup copies of the device data. This is a significant issue when a backup copy must be made of a large devices which may contain many devices or data bases which are the target of a single or common application programs.

Several further problems are encountered in the creation of backup copies. The creation of physical backup copies of device data requires the expenditure of data processor, data channel, data storage subsystem and backup data storage device resources. In addition, the concurrent access to the device data may be hindered due to device request queuing. This is necessitated by the requirement that the backup data represents a single point-in-time copy of the data for the entire source device.

An alternative to the data processor controlled device copy operation described above is the data storage subsystem snapshot copy operation described in U.S. Pat. No. 5,410,667. This snapshot copy system creates a duplicate device pointer in a virtual track directory in the data storage subsystem to reference a device that a data processor has requested the data storage subsystem to copy. This enables the data processor to access the device via two virtual addresses while only a single physical copy of the device resides in the data storage subsystem. The snapshot copy operation is effected without the involvement of the data processor, since it is managed solely within the data storage subsystem. However, the snapshot copy operation cannot be selected by the data processor, but is because it is solely within the purview of the data storage subsystem. In addition, the snapshot copy operation is not available for use in creating a backup copy of an MVS device.

SOLUTION

The above described problems are solved and a technical advance achieved in the field by the MVS device backup system of the present invention which functions to enable the data processor to manage the device backup function in a manner that minimizes the expenditure of data processor resources. This is accomplished by the MVS device backup system designating the source and destination device volumes and then activating the snapshot copy resources of the data storage subsystem to perform the device backup operation without the necessity of the data processor being involved in the execution details of the operation. In addition, the instantaneous creation of a backup copy of the device data maintains a point-in-time image of the device data from the initiation of the device backup process until a physical backup copy of the device data is available.

The implementation of the MVS device backup system is data processor based, yet the DASD volume device backup is performed without using data processor CPU resources to perform the actual movement of the device data. Thus, the traditional data reads to data processor memory and the write channel programs are not utilized to copy the device data from a source device location to a target (backup) device location. Instead, the MVS device backup system determines the source device volume on the data storage subsystem, the target device volume on the data storage subsystem and identifies the extents of both. The MVS device backup system then transmits data to the data storage subsystem, representative of the assignment of DASD full tracks from the source device location on the data storage subsystem as well as DASD full tracks from the target (backup) device location on the data storage subsystem. The data processor based MVS device backup system then uses Extended Channel Access Method (ECAM) channel programs to instruct the data storage subsystem to perform the MVS device backup operation using the data storage subsystem snapshot track pointer copy operations. Upon conclusion of the device backup operation by the data storage subsystem, the MVS device backup system updates the meta data required to complete the device backup operation. Meta data is the supporting volume and device structures, stored in the data processor, that identify the devices and maintain the device status.

This MVS device backup system is a significant departure from the prior art operation of data storage subsystems since it does not require the expenditure of a significant amount of the data processor resources. In addition, the existing data storage subsystem snapshot copy capability is used to enable the data processor to control the copying of device data to designated backup data storage locations.

BRIEF DESCRIPTION OF THE DRAWING

FIG. 2 illustrates in flow diagram form the operational steps taken by the MVS device backup system.

DETAILED DESCRIPTION

Figure 1:
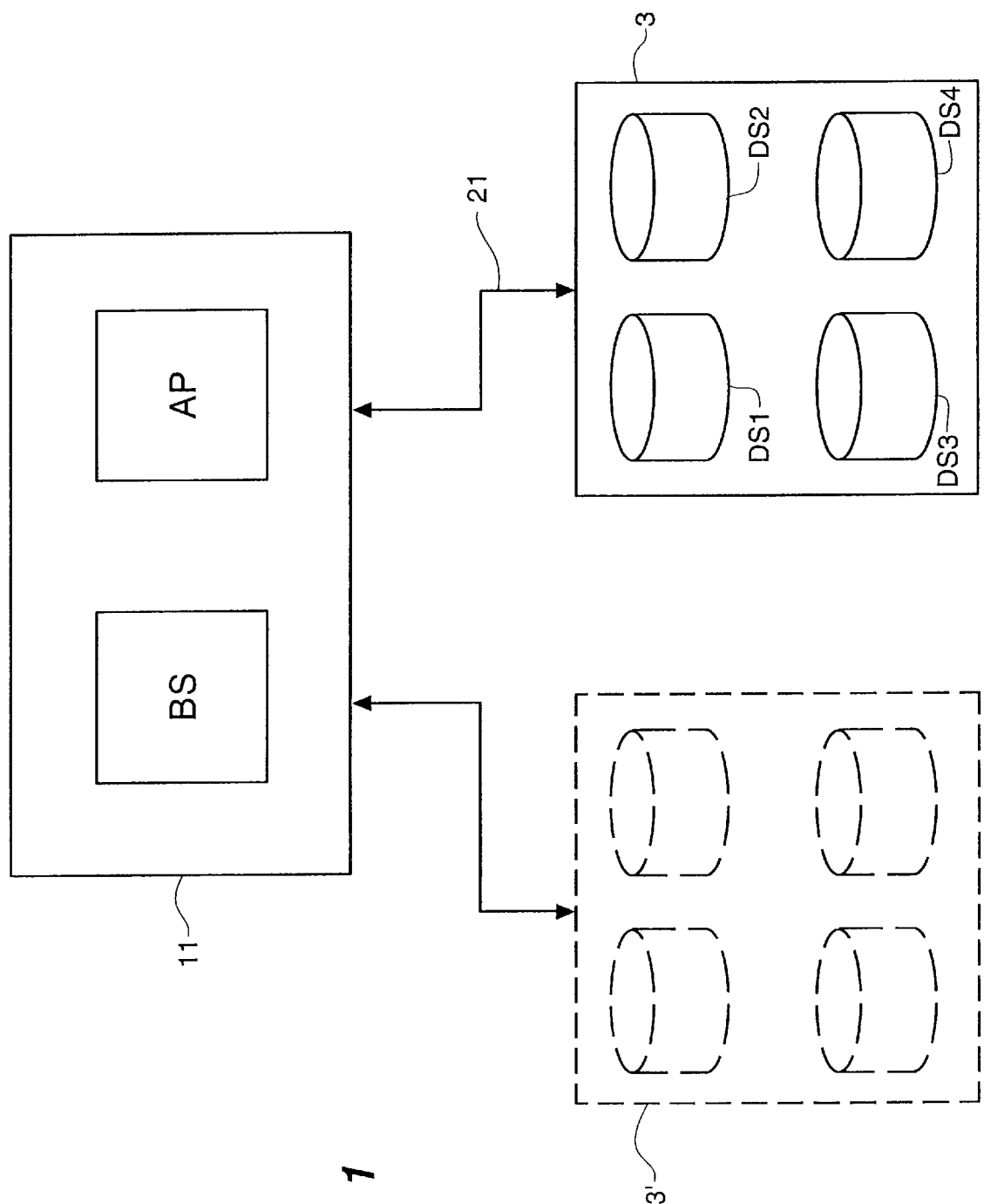
FIG. 1 illustrates in block diagram form the overall architecture of a data system which includes the MVS device backup system of the present invention.

FIG. 1 illustrates in block diagram form the overall architecture of a computer system 1 that incorporates the MVS device backup system BS of the present invention. The computer system 1 includes at least one data processor 11 to which are connected at least one data storage subsystem (DSS) 3, 3' that contains at least one and likely a plurality of data storage devices DS1-DS4 for reading and writing data onto data storage media for use by the data processor 11.

The data storage subsystem 3, 3' comprises a dynamically mapped virtual device data storage subsystem which implements a plurality of virtual data storage devices. In the preferred embodiment of the invention disclosed herein, the data storage subsystem 3 comprises a disk drive array data storage subsystem, although any data storage technology can be used to implement the data storage subsystem 3. For the purpose of simplicity of description, the disk drive array data storage subsystem example is used herein.

Mapping Tables

The data storage subsystem 3 dynamically maps between three abstract layers: virtual, logical and physical. The virtual layer functions as a conventional large form factor disk drive memory. The logical layer functions as an array of storage units that are grouped into a plurality of redundancy groups. The physical layer functions as a plurality of individual small form factor disk drives. The data storage subsystem 3 effectuates the dynamic mapping of data among these abstract layers and controls the allocation and management of the actual space on the physical devices. These data storage management functions are performed in a manner that renders the operation of the data storage subsystem 3 transparent to the data processor 11, which perceives only the virtual image of the data storage subsystem 3. A virtual device is therefore an entity addressable by data processor 11, with data processor-controlled content and data processor-managed space allocation. In this system, the virtual device consists of a mapping of a large form factor disk drive image onto a plurality of small form factor disk drives which constitute at least one redundancy group within the disk drive array. The virtual to physical mapping is accomplished by the use of a Virtual Device Table (VDT) entry which represents the virtual device. The "realization" of the virtual device is the set of Virtual Track Directory (VTD) entries, associated with the VDT entry each of which VTD entries contains data indicative of the Virtual Track Instances, which are the physical storage locations in the disk drive array redundancy group that contain the data records. The data storage management functions are performed in a manner that renders the operation of the data storage subsystems 3, transparent to data processors 11.

Device Snapshot Copy Operation

As described in U.S. Pat. No. 5,410,667, the data storage subsystem 3 includes a device copy capability which is termed a "snapshot copy" operation. The device snapshot copy operation instantaneously creates a second instance of a selected device by merely generating a new pointer to reference the same physical memory location as the original reference pointer in the virtual track directory. In this fashion, by simply generating a new pointer referencing the same physical memory space, the device can be copied. A physical copy of the original device can later be written as a background process to a second memory location, if so desired. Alternatively, when one of the programs that can access the device writes data to or modifies the device in any way, the modified track is written to a new physical memory location and the corresponding address pointers are changed to reflect the new location of this rewritten portion of the device.

This apparatus therefore instantaneously copies the original device without the time penalty of having to copy the track to the data processor 11 and then write the track to a new physical memory location on the data storage subsystem 3 via data channel 21. For the purpose of enabling a program to simply access the track at a different virtual address, the use of this mechanism provides a significant time advantage. In this fashion, a track can be instantaneously copied by simply creating a new memory pointer and the actual physical copying of the track can take place as a background process without the involvement of the data processor 11.

Operation of MVS Device Backup System

FIG. 2 illustrates in flow diagram form the operation of the MVS device 10 backup system BS, as implemented in the system environment described above. The MVS device backup system BS is illustrated herein as a device management process using the snapshot track level subsystem copy facility which is extant on the data processor 11, although other implementations, such as merging the functionality of the MVS device backup system BS into the other software running on data processor 11, are possible. In operation, data processor 11 requests the creation of a backup copy of an MVS device at step 201, which MVS device comprises a plurality of volumes of data sets stored on a virtual device on a one (for example DSS 3) of the data storage subsystem connected to data processor 11. The MVS device backup system BS, in response to the receipt of a device backup request, which includes an identification of the selected (source) MVS device, locates the identified source MVS device at step 202 and serializes the device staging request. The MVS device backup system BS searches the DSCB entries of the Volume Table of Content (VTOC) available to the data processor 11 and executes device type queries where necessary to thereby determine the device characteristics of the identified source MVS device as designated by the data processor 11. However, the data storage subsystem 3 stores data for the data processor 11 in virtual volumes, a plurality of which are implemented in data storage subsystem 3, as for example 256 logical DASD volumes. Thus, the device location information obtained by the MVS device backup system BS comprises the data processor view of the data storage location in which the selected source MVS device is stored on data storage subsystem 3.

The MVS device backup system BS, in response to the receipt of a device backup request, also locates or allocates a target location for the storage of the copy of the selected source MVS device at step 203. The MVS device backup system BS searches the DSCB entries of the VTOC available to the data processor 11 and executes device type queries where necessary to thereby determine the physical location of available memory space of sufficient extent to store the copy of the identified source MVS device. In addition, the selection of the online candidate backup device can be accomplished by user request or automatically selected based upon device usage criteria. The MVS device backup system BS typically queries the backup device to determine relevant information regarding the present state of this device, including device label, device characteristics, available memory, and the like. Once the backup device has been selected, the device is serialized by the MVS device backup system BS. The data storage subsystem 3 stores data for the data processor 11 in virtual volumes, a plurality of which are implemented in data storage subsystem 3 and the device location information obtained by the MVS device backup system BS comprises the data processor view of the data storage location in which the copy of the selected device will be stored on data storage subsystem 3, if data storage subsystem 3 is the target device for storage of the backup copy of the identified MVS device.

Once the source and target locations are identified, the MVS device backup system BS, at step 204, builds a set of ECAM channel programs to activate the copying of the identified source MVS device, and the associated creation of track pointers. In operation, the MVS device backup system BS creates an ECAM channel message for each extent of tracks that are to be copied in the identified source MVS device. These ECAM messages are submitted serially to the data storage subsystem 3 to effect the device backup operation. In particular, the MVS device backup system BS issues an ECAM source definition message to the data storage subsystem 3 to define both the Source and Target Locations as well as the Extent for both of these locations. The MVS device backup system BS transmits the ECAM source definition message to the data storage subsystem 3 over the data channel 21 which connects these two systems in well known fashion. The ECAM source definition message is used to prepare the data storage subsystem 3 for the execution of the device snapshot copy operation and also functions as a security measure. The security aspect of the process involves the passing of a token at step 205 from the data storage subsystem 3 to the MVS device backup system BS to tie the received data with future instructions received from the MVS device backup system BS. In response to the receipt of the ECAM source definition message, the data storage subsystem 3 stores the received Source and Target Location data as well as the Extent data for future use.

The MVS device backup system BS at step 206 generates an ECAM Target Execution message which instructs the data storage subsystem 3 to execute the requested MVS device backup operation, using the Source and Target Location, and Extent data received in the previous ECAM source definition message. This message is tied to the previously transmitted ECAM source definition message by the inclusion of the token which was received from the data storage subsystem 3 in the previously executed ECAM source definition message exchange. The data storage subsystem 3 uses the token included in the ECAM Target Execution message to identify the stored Source and Target Location and Extent data to perform the MVS device backup operation in well known fashion. Since the data storage subsystem snapshot copy operation executes independent of the data processor, the data storage subsystem 3 returns an MVS device backup acknowledgment message, including a polling token, at step 207 to the MVS device backup system BS on data processor 11. This polling token enables the MVS device backup system BS to query the data storage subsystem 3 to ascertain the completion status of the MVS device backup process, which physical copy is created as a background process, as noted above.

The MVS device backup query is implemented via the use of an ECAM Status Inquiry message, which comprises a status inquiry message. The MVS device backup system BS inserts the polling token in the ECAM Status Inquiry message to identify the particular device snapshot copy operation of interest (which represents the MVS device backup) and transmits the message at step 208. The data storage subsystem 3 responds to a received ECAM Status Inquiry message by returning a response at step 209 indicative of snapshot copy (MVS device backup) completed status. The MVS device backup system BS can originate as many ECAM Status Inquiry messages as needed until the data storage subsystem 3 transmits a response to the ECAM Status Inquiry message which indicates successful completion of the device snapshot copy (MVS device backup) operation.

Once the MVS device backup operation is completed, the MVS device backup system BS at step 210 must update the meta data associated with the Target backup MVS device. The meta data comprises: VTOC; Volume labels; VTOC index; Virtual Volume Data Set (VVDS) data, which is data processor 11. The MVS device backup system BS updates this data in well-known fashion to accurately reflect the location and extent of both the source MVS device as well as the backup copy of the MVS device created by the device snapshot copy operation of the data storage subsystem 3. Once the MVS device backup system BS updates the meta data, the MVS device backup system BS forces device recognition processing to be activated for the backup MVS device, which thereby allows concurrent access to both the source MVS device and the backup MVS device. At this juncture, the MVS device backup operation is completed and processing exits at step 211.

SUMMARY

The MVS device backup system therefore functions to enable the data processor to manage the device backup function of a disk data storage subsystem in a manner that minimizes the expenditure of data processor resources. This is accomplished by the MVS device backup system determining the source MVS device on the data storage subsystem, the target MVS device on the data storage subsystem and identifying the extents of both. The MVS device backup system then transmits data to the data storage subsystem, representative of the assignment of DASD full tracks from the source MVS device location on the data storage subsystem as well as DASD full tracks from the target MVS device location on the data storage subsystem. The data processor based MVS device backup system then uses ECAM channel programs to instruct the data storage subsystem to perform the MVS device backup operation using snapshot track pointer copy operations. This eliminates the need for the data processor to be intimately involved in the execution of the MVS device backup operation.

What is claimed:

1. A device backup apparatus for the copying of of a selected data storage device which is stored on a dynamically mapped virtual memory data storage subsystem having a rewriteable memory space, which device backup apparatus is extant on a data processor connected to the data storage subsystem which is operational to instantaneously create a copy of a selected device independent of said data processor, said device backup apparatus comprising:

means for allocating memory in said rewriteable memory space for a selected device written thereon as well as for a copy of said selected device;

means for transmitting control messages to said data storage subsystem to identify all data sets which comprise said selected device, and memory space for said copy of said selected device;

means for activating said data storage subsystem to implement said instantaneous copy operation on said identified all said data sets which comprise said selected device; and means, responsive to said data storage subsystem copying said selected device, for updating meta data associated with a copy of said selected device created by said data storage subsystem, which metadata is known by said data processor.

2. The device backup apparatus of claim 1 wherein said means for allocating memory comprises:

means for determining a location and an extent of said selected device.

3. The device backup apparatus of claim 1 wherein said means for allocating memory comprises:

means for determining a location and an extent of said copy of said selected device.

4. The device backup apparatus of claim 1 wherein said means for transmitting control messages comprises:

means for transmitting data to said data storage subsystem to identify a location and an extent of said selected device, and a location and an extent for said copy of said selected device.

5. A device backup apparatus for the copying of of a selected data storage device which is stored on a dynamically mapped virtual memory data storage subsystem having a rewriteable memory space, which device backup apparatus is extant on a data processor connected to the data storage subsystem which is operational to instantaneously create a copy of a selected device independent of said data processor, said device backup apparatus comprising:

means for allocating memory in said rewriteable memory space for a selected device written thereon as well as for a copy of said selected device;

means for transmitting control messages to said data storage subsystem to identify all data sets which comprise said selected device, and memory space for said copy of said selected device;

means for activating said data storage subsystem to implement said instantaneous copy operation on said identified all said data sets which comprise said selected device; and means, responsive to said data storage subsystem copying said selected device, for updating meta data associated with a copy of said selected device created by said data storage subsystem, which metadata is known by said data processor, comprising:

means for updating at least one of device meta data comprising:

VTOC; Volume labels; VTOC index; VVDS data.

6. The device backup apparatus of claim 5 wherein said means for allocating memory comprises:

means for determining a location and an extent of said selected device.

7. The device backup apparatus of claim 5 wherein said means for allocating memory comprises:

means for determining a location and an extent of said copy of said selected device.

8. The device backup apparatus of claim 5 wherein said means for transmitting control messages comprises:

means for transmitting data to said data storage subsystem to identify a location and an extent of said selected device, and a location and an extent for said copy of said selected device.

9. A device backup method for the copying of a selected data storage device which is stored on a dynamically mapped virtual memory data storage subsystem having a rewriteable memory space, which device backup method is extant on a data processor connected to the data storage subsystem which is operational to instantaneously create a copy of a selected device independent of said data processor, said device backup method comprising the steps of:

allocating memory in said rewriteable memory space for a selected device written thereon as well as for a copy of said selected device;

transmitting control messages to said data storage subsystem to identify said selected device, and memory space for said copy of said selected device;

activating said data storage subsystem to implement said instantaneous copy operation on said identified all data sets which comprise said selected device; and updating, in response to said data storage subsystem copying said selected device, meta data associated with said device and known by said data processor.

10. The device backup method of claim 9 wherein said step of allocating memory comprises:

determining a location and an extent of said selected device.

11. The device backup method of claim 9 wherein said step of allocating memory comprises:

determining a location and an extent of said copy of said selected device.

12. The device backup method of claim 9 wherein said step of transmitting control messages comprises:

transmitting data to said data storage subsystem to identify a location and an extent of said selected device, and a location and an extent for said copy of said selected device.

13. A device backup method for the copying of a selected data storage device which is stored on a dynamically mapped virtual memory data storage subsystem having a rewriteable memory space, which device backup method is extant on a data processor connected to the data storage subsystem which is operational to instantaneously create a copy of a selected device independent of said data processor, said device backup method comprising the steps of:

allocating memory in said rewriteable memory space for a selected device written thereon as well as for a copy of said selected device;

transmitting control messages to said data storage subsystem to identify said selected device, and memory space for said copy of said selected device;

activating said data storage subsystem to implement said instantaneous copy operation on said identified all data sets which comprise said selected device; and updating, in response to said data storage subsystem copying said selected device, meta data associated with said device and known by said data processor, comprising:

updating at least one of device data comprising: Volume Table of Contents (VTOC); Volume labels; VTOC index; Virtual Volume Data Set (VVDS) data.

14. The device backup method of claim 13 wherein said step of allocating memory comprises:

determining a location and an extent of said selected device.

15. The device backup method of claim 13 wherein said step of allocating memory comprises:

determining a location and an extent of said copy of said selected device.

16. The device backup method of claim 13 wherein said step of transmitting control messages comprises:

transmitting data to said data storage subsystem to identify a location and an extent of said selected device, and a location and an extent for said copy of said selected device.

* * * * *